US011589690B2

(12) United States Patent
Kim

(10) Patent No.: US 11,589,690 B2
(45) Date of Patent: Feb. 28, 2023

(54) INDIRECT TOUCH APPARATUS FOR BELONGINGS

(71) Applicant: Soonil Kim, Seoul (KR)

(72) Inventor: Soonil Kim, Seoul (KR)

( * ) Notice: Subject to any disclaimer, the term of this patent is extended or adjusted under 35 U.S.C. 154(b) by 90 days.

(21) Appl. No.: 17/199,456

(22) Filed: Mar. 12, 2021

(65) Prior Publication Data

US 2022/0151405 A1    May 19, 2022

(30) Foreign Application Priority Data

Nov. 17, 2020    (KR) .......................... 10-2020-0153567

(51) Int. Cl.
*A47F 13/08*        (2006.01)
(52) U.S. Cl.
CPC ..................................... *A47F 13/08* (2013.01)
(58) Field of Classification Search
CPC ... A47F 13/06; A47F 13/08; A45F 2200/0516
USPC ..................................................... 294/25, 26
See application file for complete search history.

(56) References Cited

U.S. PATENT DOCUMENTS

| | | | | |
|---|---|---|---|---|
| 3,093,402 A | * | 6/1963 | Sisson ...................... | A45B 3/00 135/65 |
| 8,483,786 B2 | * | 7/2013 | Ramies ..................... | B67B 7/16 455/575.8 |
| 8,636,183 B1 | * | 1/2014 | Steiner .................... | A45C 11/00 224/560 |
| 2008/0164291 A1 | * | 7/2008 | Goradesky .............. | A45F 5/021 224/269 |
| 2017/0119118 A1 | * | 5/2017 | Williams .................. | A45F 5/00 |
| 2020/0086477 A1 | * | 3/2020 | Fulkerson ............. | E05B 1/0053 |

FOREIGN PATENT DOCUMENTS

EP            2037660 A1 *  3/2009  ............... A45F 5/02
KR        10-2176131 B1    11/2020

* cited by examiner

*Primary Examiner* — Dean J Kramer
(74) *Attorney, Agent, or Firm* — Revolution IP, PLLC

(57) ABSTRACT

An indirect touch apparatus for belongings may includes a housing (110) having a draw-in/out guide path (20) recessed in a longitudinal direction; a touch part (120) that is slidably provided in the draw-in/out guide path (20) and is curvatured out in one direction so that one side part is in contact with a touch object; a pressing knob (130) for drawing the touch part (120) into and out of the housing (110); and a mounting portion (140) for providing the housing (110) on one side of the rear surface of the belongings (200).

4 Claims, 8 Drawing Sheets

INDIRECT TOUCH APPARATUS FOR BELONGINGS

TECHNICAL FIELD

The present invention relates to an indirect touch apparatus, and more particularly, to an indirect touch apparatus for belongings which is located on one side of belongings and capable of indirectly touching belongings.

BACKGROUND ART

Recently, due to the spread of novel coronavirus infection (Corona 19), many people wear masks in their daily lives to prevent the spread of Corona 19, and use hand sanitizers to disinfect their hands.

In addition, people are trying to minimize contact with contaminants by performing indirect touch on an object to be touched using various devices other than hands in order not to directly contact the surrounding contaminants.

In general, indirect touch is an act of indirectly contacting a touch object using a separate device without directly touching a touch object by a user's hand that is contaminated or expected to be contaminated.

As an indirect touch apparatus for such an indirect touch, recently, an indirect touch apparatus of Korean Patent Publication No. 10-2176131, which has been filed for a patent as an indirect touch apparatus, and an indirect touch apparatus on the market may be used. Alternatively, users may use portable terminals carried by themselves.

The indirect touch apparatus of Korean Patent Publication No. 10-2176131, which has been marketed or filled for a patent, has a rod shape.

Accordingly, when the touch object is a button of an elevator that is used by an unspecified number of people, the user may take out a rod-shaped indirect touch apparatus from a pocket to press the button of the elevator indirectly using the same. In the case of using a portable terminal, the elevator button is indirectly pressed using the side edge of the portable terminal.

However, there are various inconveniences in that the rod-shaped indirect touch apparatus has to be carried separately, and whenever the touch object is pressed, the touch object has to be taken out of a pocket, pressed, and then put back into the pocket.

On the other hand, since the portable terminal is always carried by hand in daily life, there may be no inconvenience caused by the indirect touch apparatus. However, as the portable terminal directly contacts a touch object contaminated with viruses or bacteria for indirect touch, the contacted part may be first contaminated, and there is a problem of causing secondary contamination by continuously touching the phone by hand in order to receive a phone call or use the portable terminal in this contaminated state.

PRIOR ARTS

Patent Document (Patent Document 1) Korean Patent Registration No. 10-2176131 (registered on Nov. 3, 2020)

Disclosure

Technical Problem

Accordingly, the present invention has been derived to solve the above problems, and an object of the present invention is to provide an indirect touch apparatus for belongings, which is located on one side of belongings and capable of indirectly touching an object to be touched.

An object of the present invention is to provide an indirect touch apparatus for belongings that is fixed to one side of belongings and can remove the inconvenience of carry a separate indirect touch apparatus or taking out and using a touch object from a pocket, etc.

An object of the present invention is to provide an indirect touch apparatus for belongings capable of preventing secondary contamination by primary contamination caused by contact with a touch object contaminated with viruses or bacteria.

The objects of the present invention are not limited to the above-mentioned aspects, and other objects and advantages of the present invention, which are not mentioned, will be understood through the following description, and will become apparent from the embodiments of the present invention. In addition, it will be appreciated that the objects and advantages of the present disclosure will be easily realized by those skilled in the art based on the appended claims and a combination thereof.

Technical Solution

According to the present invention to achieve the objects, a feature of an indirect touch apparatus for belongings may include a housing (110) having a draw-in/out guide path (20) recessed in a longitudinal direction; a touch part (120) that is slidably provided in the draw-in/out guide path (20) and is curvatured out in one direction so that one side part is in contact with a touch object; a pressing knob (130) for drawing the touch part (120) into and out of the housing (110); and a mounting portion (140) for providing the housing (110) on one side of the rear surface of the belongings (200).

Preferably, the touch part (120) may be provided to be flexible with a plate-like external shape such as a plate shape having a constant width, and curvature-molded to maintain a curved shape in one direction.

Preferably, the mounting unit (140) may be mounted in a form of being bonded or fastened to the belongings (200), or mounted in a form of being fused or welded to the belongings so that the belongings (200) and the housing (110) may be firmly fixed.

Preferably, the indirect touch apparatus for belongings may further include a protrusion part (111) provided in the form of a protrusion form in a direction of the draw-in/out guide path (20) at an inlet which is drawn in or out to the draw-in/out guide path (20) of the housing (110).

Preferably, the indirect touch apparatus for belongings may further include a cover part that is rotatably provided on the inner surface of the housing (110) using a torsion coil spring to block a front end of the housing (110) when the draw-in of the touch part (120) is completed.

Preferably, the touch part (120) may have a thickness of 0.5 [mm] or more and 1.5 [mm] or less.

Advantageous Effects

The indirect touch apparatus for belongings according to the present invention as described above has the following effects.

First, the touch apparatus may be positioned on one side of belongings to indirectly touch a touch object.

Second, it is possible to remove the inconvenience of carrying a separate indirect touch apparatus by being fixed to belongings, or taking out and using the indirect touch apparatus from a pocket or the like when a touch object is pressed.

Third, it is possible to prevent secondary contamination by primary contamination caused by contact a touch object contaminated with viruses or bacteria.

In addition to the above-described effects, specific effects of the present invention will be described together with explanation of specific matters for carrying out the present invention.

MODES OF THE INVENTION

Figure 1:
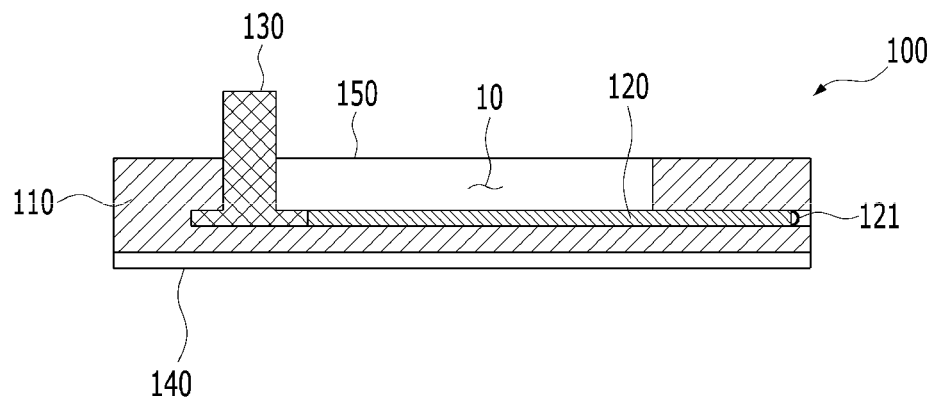
FIGS. 1 and 2 are configuration diagrams illustrating a configuration of an indirect touch apparatus for belongings according to a first embodiment of the present invention.

Other objects, features and advantages of the present invention will be apparent from the detailed description of the embodiments with reference to the accompanying drawings.

Terms used in the present invention adopt general terms which are currently widely used as possible by considering functions in the present invention, but the terms may be changed depending on an intention of those skilled in the art, a precedent, emergence of new technology, etc. Further, in a specific case, a term arbitrarily selected by an applicant is present and in this case, a meaning of the term will be disclosed in detail in a corresponding description part of the invention. Accordingly, the term used in the present invention should be defined based on not just a name of the term but a meaning of the term and contents throughout the present invention.

A preferred embodiment of an indirect touch apparatus for belongings according to the present invention will be described with reference to the accompanying drawings. However, the present invention is not limited to embodiments disclosed below but embodied in many different forms, and the present embodiments are merely to be provided to complete the disclosure of the present invention and fully inform the scope of the invention to those skilled in the art. Therefore, the embodiments described in the present specification and the configurations illustrated in the drawings are merely the most preferred embodiment of the present invention and are not intended to represent all of the technical ideas of the present invention, and thus, it should be understood that various equivalents and modifications capable of replacing the embodiments at the time of this application.

Hereinafter, the fact that an arbitrary configuration is disposed at the "upper (or lower)" of the component or "on (or below)" the component may mean that not only that an arbitrary component is disposed in contact with an upper surface (or lower surface) of the component, but also that other components may be interposed between the component and any component disposed on (or below) the component.

In addition, when a component is described as being "connected", "coupled" or "accessed" to another component, it will be understood that the components may be directly connected or accessed to each other, but other components are "interposed" between the components, or each component may be "connected", "coupled" or "accessed" through other components.

Figure 2:
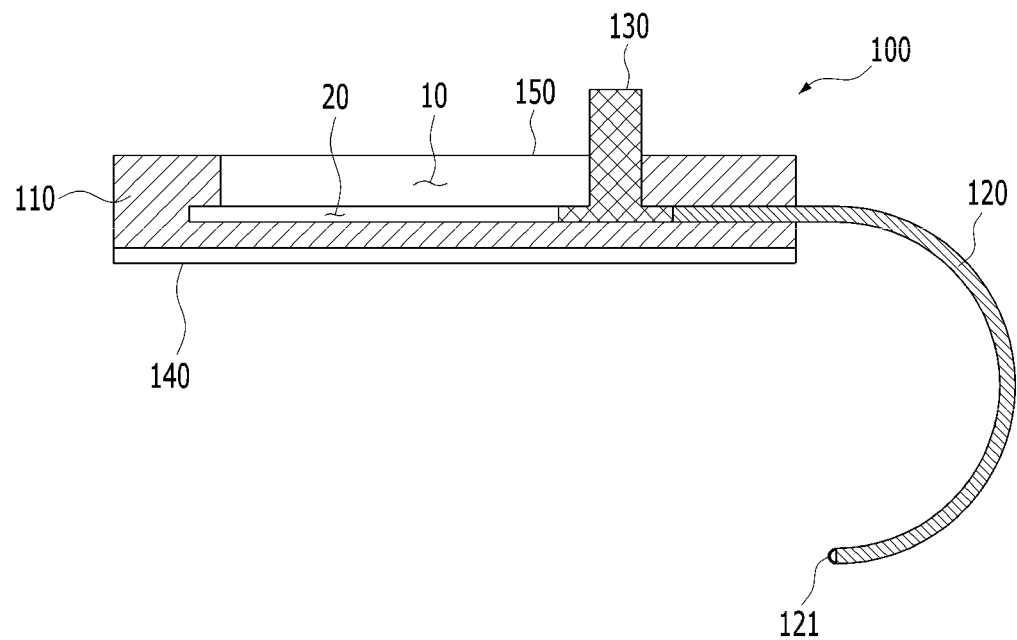

FIGS. 1 and 2 are configuration diagrams illustrating a configuration of an indirect touch apparatus for belongings according to a first embodiment of the present invention. The indirect touch apparatus 100 for belongings illustrated in FIGS. 1 and 2 follows the embodiment and constituent elements thereof are not limited to the embodiment illustrated in FIG. 1 and as necessary, some constituent elements may be added, modified, or deleted.

As illustrated in FIGS. 1 and 2, the indirect touch apparatus 100 for belongings of the present invention includes a housing 110, a touch part 120, a pressure knob 130, and a mounting part 140.

Hereinafter, respective components will be described in detail with reference to FIGS. 1 and 2.

The housing 110 may have a draw-in/out guide path 20 recessed from its end to the inside along its length direction. In this case, the housing 110 is provided on one side of the rear surface of the belongings, and the provided one side may have an external shape such as a flat or round (circle, ellipse) shape or a rectangular parallelepiped shape. The belongings may include portable terminals, wallets, name tags, and the like. In the present specification, for ease of explanation, belongings may be limited to a portable terminal, but it should be noted that this is not for limitation.

All or part of the housing 110 may be consist of a polymer material such as rubber, silicone, thermoplastic elastomer, urethane, plastic, or a metal such as copper, aluminum, and iron, and alloys thereof. The housing 110 may be made of an antimicrobial material itself, or the antimicrobial material may be contained therein or coated on the surface thereof. The antimicrobial material may include any one or at least one of an inorganic antimicrobial agent, for example, a metal such as copper, silver, zirconium, zinc, or gold, a compound of the metal and other elements, or a material in which the metal is adsorbed or bound to as a carrier such as zeolite or glass; an organic antimicrobial agent and a natural antimicrobial agent. Alternatively, a small ultraviolet light generating device may be installed or an antimicrobial agent may be filled inside the housing 110.

For reference, in the case where the housing 110 is a plastic injection product, as an example, when a molding material is mixed before melting, an antibacterial material is added to a plastic resin and mixed together, so that the antimicrobial material may be contained in the housing 110. As another example, the housing 110 is molded into a plastic injection product, and then the antimicrobial material may be coated on the outer surface thereof.

Accordingly, the housing 110 may prevent maximally the remaining contaminants on the inner surface of the draw-in/out guide path 20 while maximally eradiating contaminants buried in the touch part 120 or transmitted to the inner surface of the draw-in/out guide path 20 by the antimicrobial material while being inserted into the draw-in/out guide path 20 of the housing 110.

The touch part 120 may be accommodated in the housing 110 to be slidably provided in the draw-in/out guide path 20 and may be drawn out to contact the object to be touched. In this case, since the touch part 120 is provided to surround one side of belongings to have an external shape such as a plate shape having a constant width. For reference, the touch part 120 is a component for substantially touching the touch object (including not only a simple contact but also an action pressing by applying a force) instead of a user's hand.

All or part of the touch part 120 may be consist of a polymer material such as rubber, silicone, thermoplastic elastomer, urethane, plastic, or a metal such as copper, aluminum, and iron, and alloys thereof. The touch part 120 may be made of an antimicrobial material itself, or the antimicrobial material may be contained therein or coated on the surface thereof.

For reference, in the case where the touch part 120 is a plastic injection product, as an example, when a molding material is mixed before melting, an antibacterial material is added to a plastic resin and mixed together, so that the antimicrobial material may be contained in the touch part 120. As another example, the touch part 120 may be molded into a plastic injection product, and then the antimicrobial material may be coated on the outer surface thereof.

In addition, the touch part 120 may further include a pressure-resistant member 121 at an end. The pressure-resistant member 121 may be made of a hard material, and may guide the touch part 120 to advance while smoothly sliding along the draw-in/out guide path 20. As an example, the pressure-resistant member 121 may be composed of a brass tip.

A more detailed description of the touch part 120 will be described below with reference to FIG. 3.

The pressing knob 130 is a component for drawing in/out the touch part 120 in the housing 110. In this case, a knob guide hole 150 may be formed on one surface of the housing 110 by penetrating 10 in a longitudinal direction in which the pressing knob 130 is moved to be elongated. One end of the pressing knob 130 is exposed to the outside through the knob guide hole 150, and the other end thereof may be fixed to the touch part 120.

Accordingly, when the user pushes the pressing knob 130 with a finger or the like in the longitudinal direction of the housing 110, the pressing knob 130 is moved along the knob guide hole 150, and at this time, the touch part 120 fixed to the pressing knob 130 may naturally slide along the draw-in/out guide 20 of the housing 110 to be drawn out to the outside of the housing 110.

Further, as illustrated in FIG. 2, the movement distance of the pressing knob 130 is limited by the knob guide hole 150, and the draw-in/out distance of the touch part 120 may be limited. That is, when the user pushes the pressing knob 130, the pressing knob 130 moves along the knob guide hole 150 and then stops at the end of the knob guide hole 10, so that the draw-out distance of the touch part 120 may be limited.

All or part of the pressing knob 130 may be consist of a polymer material such as rubber, silicone, thermoplastic elastomer, urethane, plastic, or a metal such as copper, aluminum, and iron, and alloys thereof. The pressing knob 130 may be made of an antimicrobial material itself, or the antimicrobial material may be contained therein or coated on the surface thereof.

A more detailed description of the pressing knob 130 will be described below with reference to FIG. 4.

The mounting part 140 is located on the rear surface of the housing 110 and is a component for mounting the housing 110 to the belongings 200. At this time, the mounting part 140 is provided so that the belongings 200 and the housing 110 may be firmly fixed, and is mounted in a form of being bonded or fastened to the belongings 200, or may be mounted in a form of being fused or welded to the belongings.

In this case, the bonded form may consist of an adhesive, an adhesive tape, an adhesive sheet, a bulk tape, and the like having adhesive strength. However, the present invention is not limited thereto, and the bonded form may be made of various materials having adhesive force capable of maintaining the firmly bonded state in close contact with each other. In addition, in the fastened form, a contact protrusion and a seating groove configured to correspond to each other are configured on the rear surface of the belongings 200 and the contact surface of the housing 110, respectively, so that the contact protrusion and the seating groove are fastened to each other. Alternatively, in the form of being fused or welded to belongings, the belongings and the housing 110 may be configured as one body during molding.

Figure 3:
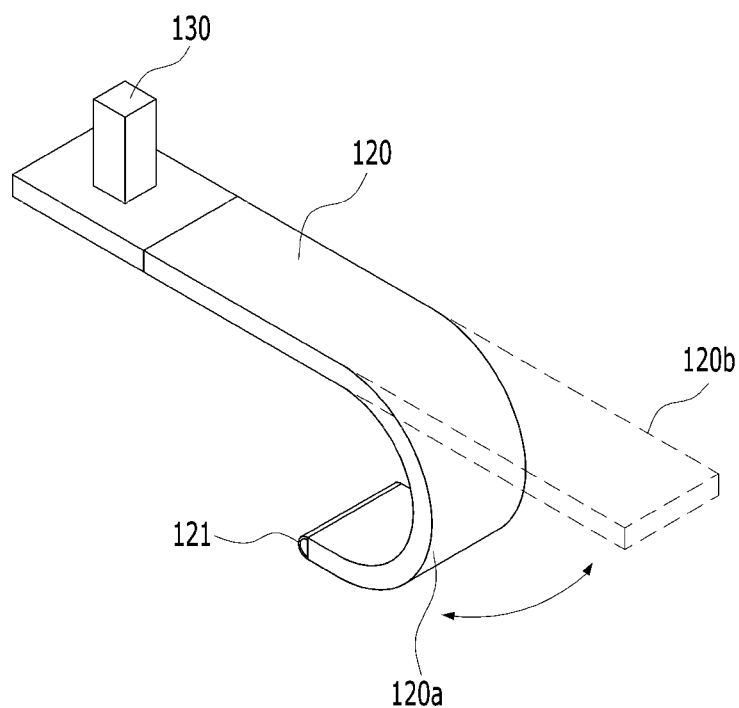
FIG. 3 is a configuration diagram illustrating in detail a configuration of a touch part in an indirect touch apparatus for belongings according to an embodiment of the present invention.

FIG. 3 is a configuration diagram illustrating in detail a configuration of a touch part in an indirect touch apparatus for belongings according to an embodiment of the present invention.

As illustrated in FIG. 3, the touch part 120 may be configured to be flexible and having an external shape such as a plate shape having a constant width. In addition, the touch part 120 may be curvatured in a semicircular shape in one direction.

Through this, the touch part 120 maintains a curved semicircular shape 120a in one direction at normal times through curvature molding, and when pressing is generated through a flexible configuration, the curved semicircular shape may be transformed into a straight shape 120b.

Therefore, as illustrated in FIG. 1, when the touch part 120 is positioned in a state of being inserted into the draw-in/out guide path 20 of the housing 110, the straight shape 120b is maintained by a flexible configuration.

In addition, as illustrated in FIG. 2, when one end of the touch part 120 is exposed to the outside while being drawn out from the draw-in/out guide path 20 of the housing 110, the curved semicircular shape 120a is maintained due to curvature molding.

It is preferable that the touch part 120 has a thickness of 0.5 [mm] or more and 1.5 [mm] or less.

At this time, in the case where the thickness of the touch part 120 is less than 0.5 [mm], when the touch part 120 is drawn out of the housing 110, it is difficult to maintain the shape of the curved semicircular shape 120a as the vertical limpness increases. In addition, in the case where the thickness of the touch part 120 is less than 0.5 [mm], when the touch part 120 is inserted into the housing 110, there is a problem that a phenomenon of overlapping the touch part 120 in the housing 110 occurs due to folding or rolling.

In addition, in the case where the thickness of the touch part 120 is greater than 1.5 [mm], when the touch part 120 is drawn in from the outside to the inside of the housing 110, the bending strength of the touch part 120 increases, and thus it is difficult to smoothly insert the touch part 120 into the housing 110. In the case where the thickness of the touch part 120 is more than 1.5 [mm], when the touch part 120 is drawn out to the outside from the inside of the housing 110, the flexural stiffness of the curved semicircular shape 120*a* maintained by curvature molding decreases, and thus, there is a problem in that restoration is not easy. That is, due to the decrease in flexural stiffness, when the touch part 120 is drawn out of the housing 110, the radius of curvature of the curved semicircular shape 120*a* increases. In addition, due to a decrease in flexural stiffness, when the touch part 120 is drawn into the housing 110, the touch part 120 may be cut off or bent.

All or part of the touch part 120 may be consist of a polymer material such as rubber, silicone, thermoplastic elastomer, urethane, plastic, or a metal such as copper, aluminum, and iron, and alloys thereof. The touch part 120 may be additionally made of an antimicrobial material itself, or the antimicrobial material may be contained therein or coated on the surface thereof.

Figure 4A:
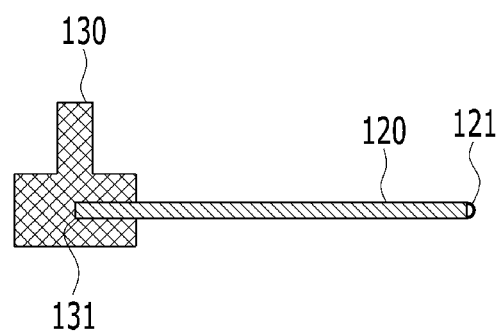
FIGS. 4A and 4B are configuration diagrams illustrating in detail a configuration of a pressing knob in an indirect touch apparatus for belongings according to an embodiment of the present invention.
Figure 4B:
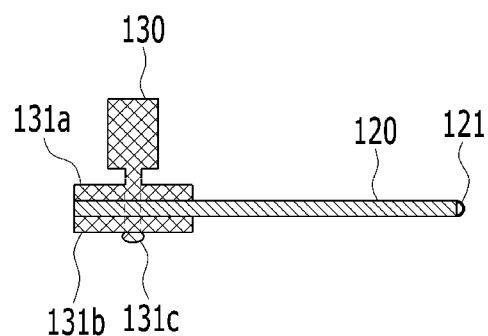

FIGS. 4A and 4B are configuration diagrams illustrating in detail a configuration of a pressing knob in an indirect touch apparatus for belongings according to an embodiment of the present invention.

As illustrated in FIGS. 4A and 4B, one end of the pressing knob 130 is exposed to the outside through the knob guide hole 150, and the other end thereof may be fixed to the touch part 120.

At this time, the pressing knob 130 is a configuration for fixing the other end and the touch part 120, and as illustrated in FIG. 4A, a lower end 131*c* of the pressing knob 130 is formed to be thicker than the upper end, and a seating groove 131 may be provided on one side of the upper end.

In addition, by inserting and fixing one side of the touch part 120 into the seating groove 131, the pressing knob 130 may fix the other end and the touch part 120 to each other.

In this case, in the pressing knob 130, the height and width of the seating groove 131 may be equal to the height and width of the touch part 120 or may be formed large enough to be completely tightly fixed when the touch part 120 is inserted into the seating groove 131.

In addition, the pressing knob 130 is a configuration for fixing the other end and the touch part 120, and as illustrated in FIG. 4B, a lower end 131*c* of the pressing knob 130 is formed in a pin shape, and a through hole 120 may be provided in the touch part 120 corresponding thereto.

The lower end 131*c* of the pressing knob 130 is inserted and fixed into the through hole provided in the touch part 120 in the form of a pin, and thus, the pressing knob 130 may fix the other end and the touch part 120 to each other.

At this time, the lower end 131*c* of the pressing knob 130 is the same as the width of the through hole provided in the touch part 120, or the lower end 131*c* of the pressing knob 130 may be formed large enough to be completely tightly fixed when inserted into the through hole of the touch part 120. Alternatively, the lower end 131*c* of the pressing knob 130, which is inserted into the through hole of the touch part 120 and exposed downward, may be fixed using a fixing nut (not illustrated).

On the other hand, due to the flexible configuration of the touch part 120 having an external shape such as a plate having a constant width, when pressing is generated in the longitudinal direction of the housing 110 for sliding of the pressing knob 130, the through hole may be deformed.

In order to solve this problem, the pressing knob 130 may further include safety plates 131*a* and 131*b* having through holes formed at positions corresponding to at least one of the upper and lower portions of the touch part 120.

However, a coupling structure illustrated in FIGS. 4A and 4B is only one embodiment, and is not limited thereto, and may be configured in various methods known at present, such as welding, an adhesive member, and a fastening device (a coupling protrusion+a seating groove, etc.).

All or part of the pressing knob 130 may be consist of a polymer material such as rubber, silicone, thermoplastic elastomer, urethane, plastic, or a metal such as copper, aluminum, and iron, and alloys thereof. The pressing knob 130 may be made of an antimicrobial material itself, or the antimicrobial material may be contained therein or coated on the surface thereof.

Figure 5A:
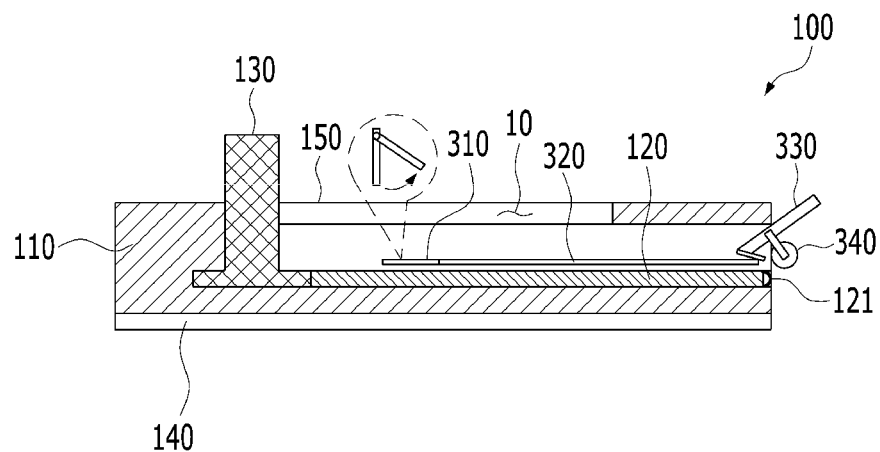
FIGS. 5A and 5B are configuration diagrams illustrating a configuration of an indirect touch apparatus for belongings according to a second embodiment of the present invention.
Figure 5B:
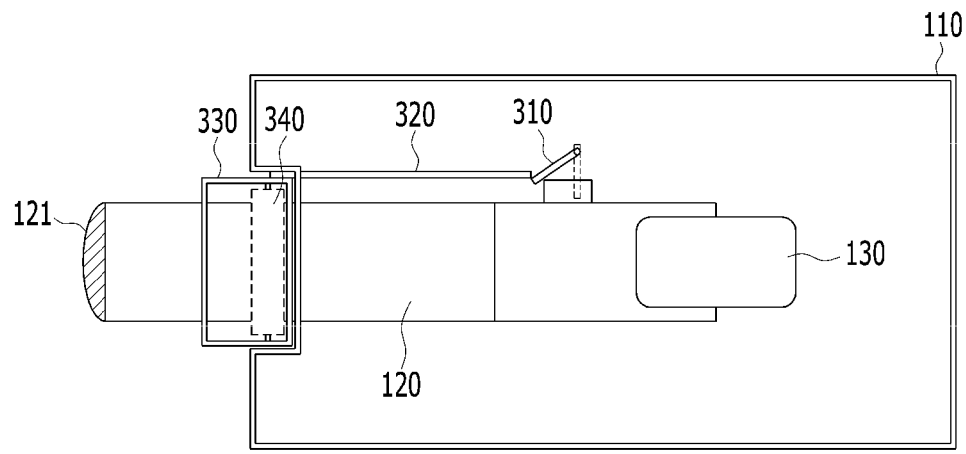

FIGS. 5A and 5B are configuration diagrams illustrating a configuration of an indirect touch apparatus for belongings according to a second embodiment of the present invention.

As illustrated in FIGS. 5A and 5B, an indirect touch apparatus 100 for belongings of a second embodiment may include a housing 110, a touch part 120, a pressure knob 130, a mounting part 140, and cover parts 310 to 340.

At this time, the housing 110, the touch part 120, the pressing knob 130, and the mounting part 140 are the same as those of FIGS. 1 and 2, and detailed descriptions of these components are omitted since they have been described above. In addition, only the cover parts 310 to 340 having a difference from the configuration of FIGS. 1 and 2 will be described in detail with reference to FIGS. 5A and 5B.

The cover parts 310 to 340 may include a cover member 330, a torsion coil spring 310, a front-rear rail 320, and a roller 340.

The cover member 330 may be rotatably provided above the front end of the housing 110. The cover member 330 may be made of a synthetic resin including rubber, plastic, urethane, etc., and a metal including brass or red brass. In addition, the cover member 330 may contain an antimicrobial material therein or may be coated with the antimicrobial material on the outer surface thereof.

In addition, the cover member 330 may be provided with a sealing member such as silicone or rubber for sealing at a portion where the front end is blocked by contacting the housing 110.

The torsion coil spring 310 may be rotatably provided on the inner surface of the housing 110. The torsion coil spring 310 may apply a rotational force to the cover member 330 in a closed direction when the touch part 120 is drawn in. Accordingly, when all of the touch part 120 is inserted into the housing 110, the adhesion of the cover member 330 to the end of the housing 110 may be increased.

The front-rear moving rail 320 may be provided on the inner side of the housing 110 to be elongated in the longitudinal direction, and may be provided to be moved back and forth in the longitudinal direction. In addition, the front-rear moving rail 320 may have one end rotatably connected to the inner surface of the cover member 330 and the other end may be rotatably connected to the torsion coil spring 310.

Accordingly, the front-rear moving rail 320 may transmit the rotational force of the torsion coil spring to the cover member 330.

The roller 340 may be located at the upper end of the cover member 330 and may be rotatably provided according to the movement of the contact surface. The roller 340 is in contact with the upper surface of the touch unit 120 that is drawn in or out from the draw in/out guide path 20 of the housing 110, so that the touch part 120 may assist in smooth sliding along the draw in/out guide path 20 of the housing 110.

At this time, the roller 340 may be made of a synthetic resin including rubber, plastic, urethane, etc., and a metal including brass or red brass. In addition, the roller 340 may contain an antimicrobial material therein or may be coated with the antimicrobial material on the outer surface thereof.

Through this configuration, the cover parts 310 to 340 may give an operation so that the front-rear moving rail 320 retracted backward by pulling the pressing knob 130 rearward (that is, the touch part 120 is retracted) is pulled backward by the elastic restoring force of the coil spring 310. That is, it is possible to prevent the cover member 330 from being opened.

Meanwhile, the cover parts 310 to 340 may maintain that the cover member 330 is opened due to the exposure of the touch part 120 even if the front-rear moving rail 320, which is advanced by pushing the pressing knob 130 forward (that is, the touch part 120 is advanced), is pushed by bouncing forward by the elastic restoring force of the torsion coil spring 310.

However, the structure of the torsion coil spring of the cover parts 310 to 340 illustrated in FIGS. 5A and 5B is only one embodiment and is not limited thereto, and may be configured in various types using a pinion gear or the like.

Figure 6A:
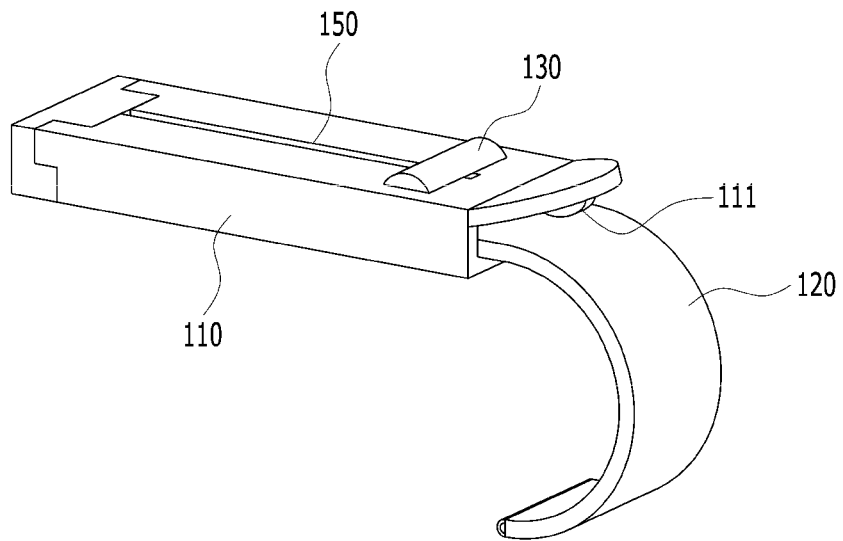
FIGS. 6A and 6B are configuration diagrams illustrating a configuration of an indirect touch apparatus for belongings according to a third embodiment of the present invention.
Figure 6B:
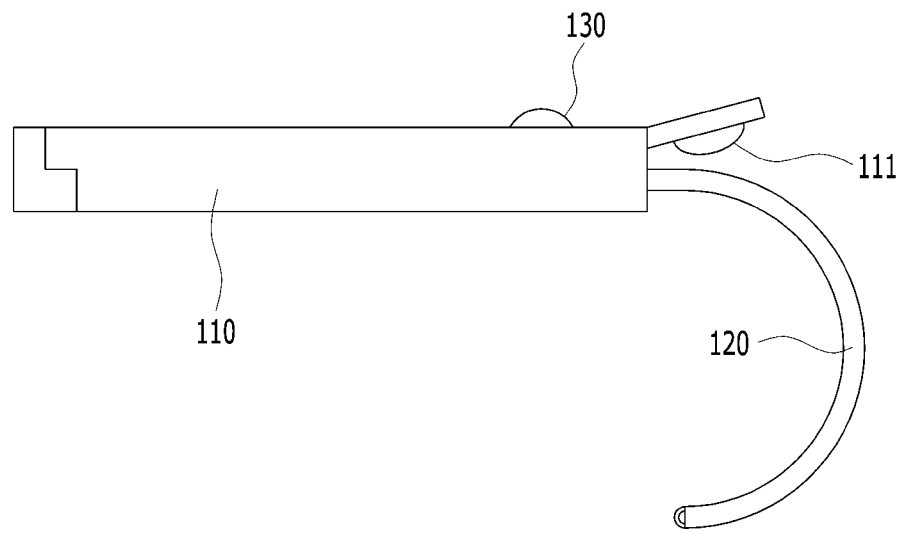

FIGS. 6A and 6B are configuration diagrams illustrating a configuration of an indirect touch apparatus for belongings according to a third embodiment of the present invention.

As illustrated in FIGS. 6A and 6B, an indirect touch apparatus 100 for belongings of a third embodiment may include a housing 110, a touch part 120, a pressure knob 130, a mounting part 140, and a protrusion part 111.

At this time, the housing 110, the touch part 120, the pressing knob 130, and the mounting part 140 are the same as those of FIGS. 1 and 2, and detailed descriptions of these components are omitted since they have been described above. In addition, only the protrusion part 111 having a difference from the configuration of FIGS. 1 and 2 will be described in detail with reference to FIGS. 6A and 6B.

The protrusion part 111 is provided in a protrusion form in a direction of the draw-in/out guide path 20 at an inlet drawn in or out to the draw-in/out guide path 20 of the housing 110, and may be in contact with the surface of the touch part 120 drawn in or out to the draw-in/out guide path 20 so that the touch unit 120 slides. That is, the protrusion part 111 may prevent the surface of the touch part 120 in contact with the touch object from entering while rubbing against tan upper plate of the inlet of the housing 110, when drawn in or out to the draw-in/out guide path 20.

Through the configuration of the protrusion 111, it is possible to prevent deformation of the housing 110 due to friction with the touch unit 120, and to prevent primary contamination of the portion in contact with the touch part 120 from occurring as secondary contamination contaminated by a user who uses the indirect touch apparatus 100 for belongings.

All or part of the protrusion part 111 may be consist of a polymer material such as rubber, silicone, thermoplastic elastomer, urethane, plastic, or a metal such as copper, aluminum, and iron, and alloys thereof. The protrusion part 111 may be made of an antimicrobial material itself, or the antimicrobial material may be contained therein or coated on the surface thereof.

An operation of the indirect touch apparatus according to the present invention configured above will be described below in detail with reference to the accompanying drawings. Like reference numerals in FIG. 1 or 4 denote the same members performing the same function.

Figure 7:
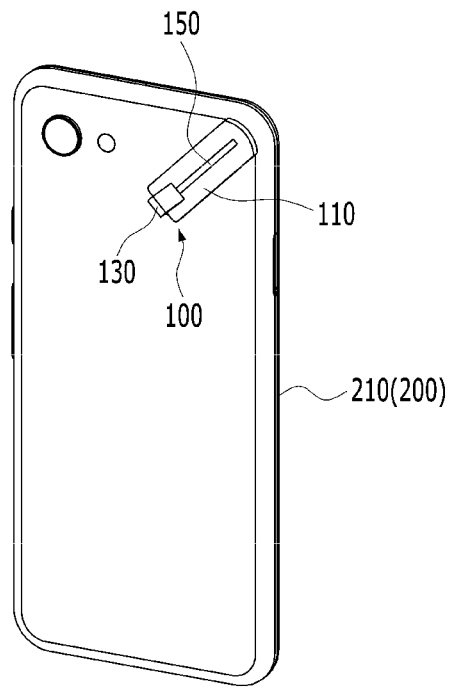
FIGS. 7 and 9 are configuration diagrams illustrating an operation of an indirect touch apparatus for belongings according to an embodiment of the present invention.
Figure 9:
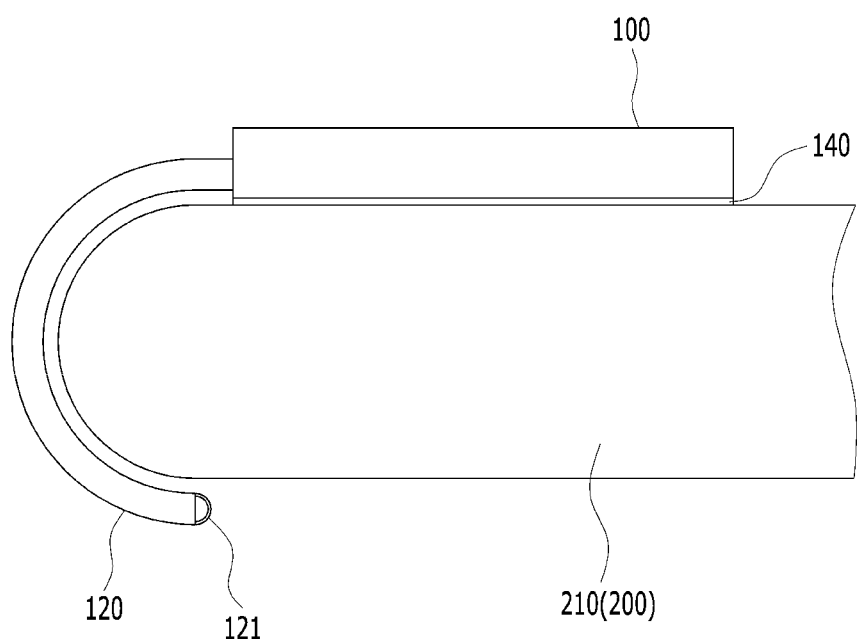

FIGS. 7 and 9 are configuration diagrams illustrating an operation of an indirect touch apparatus for belongings according to an embodiment of the present invention.

Figure 8:
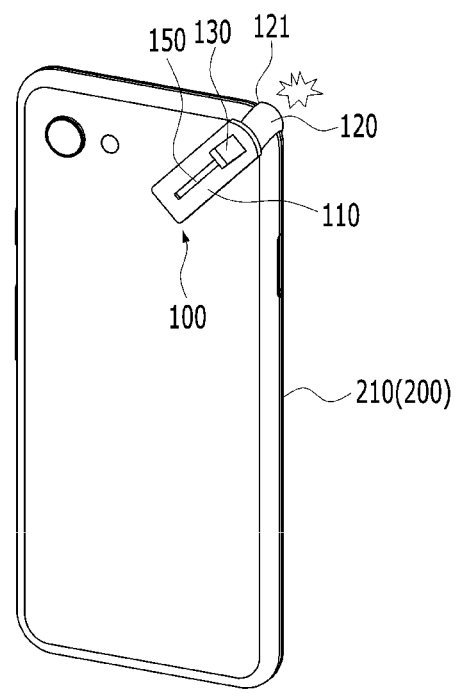

First, as illustrated in FIGS. 7 and 8, the indirect touch device 100 for belongings may be provided on one side of the rear surface of the portable terminal 210.

When the indirect touch apparatus 100 for belongings is not used, that is, when only the portable terminal 210 is used normally, as illustrated in FIG. 7, it is illustrated a state in which the touch part 120 is completely drawn into the draw-in/out guide path 20 of the housing 110 by pulling the pressing knob 130 rearward so that the touch part 120 is accommodated in the housing 110.

At this time, in the case of the indirect touch apparatus 100 for belongings provided with the cover parts 310 to 340, the cover member 330 is pulled backward by the elastic restoring force of the torsion coil spring 310 to be covered at the end of the housing 110.

Thereafter, when performing an indirect touch on a touch object using the indirect touch apparatus 100 for belongings, as illustrated in FIG. 8, it is illustrated a state in which the touch part 120 is drawn out from the draw-in/out guide path 20 of the housing 110 by pushing the pressing knob 130 forward, so that the touch part 120 is exposed to the outside of the housing 110.

In this case, when the touch part 120 is drawn out as illustrated in FIG. 9, the touch part 120 maintains a curved semicircular shape so that an edge portion of the portable terminal 210 is covered by the touch part 120. Therefore, when the user touches the touch object with the edge of the portable terminal 210, the touch part 120 covering the edge of the portable terminal 210 comes into contact with the touch object.

Thereafter, when the use of the indirect touch apparatus 100 for belongings is completed, as illustrated in FIG. 6, the touch part 120 is completely drawn into the draw-in/out guide path 20 of the housing 110 by pulling the pressing knob 130 rearward so that the touch part 120 is accommodated in the housing 110.

At this time, the indirect touch apparatus 100 is an antimicrobial material itself, or an antimicrobial material is contained therein or coated on the surface thereof, so that the contaminants on the touch part 120 accommodated in the housing 110 may be eradicated by the antimicrobial material as much as possible.

Figure 10:
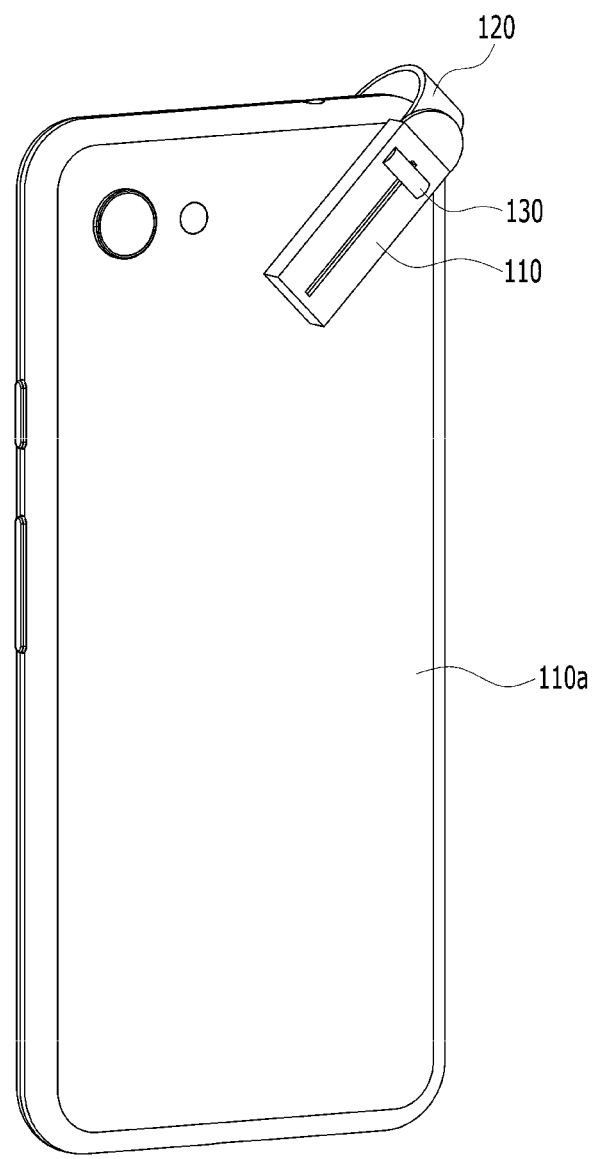
FIG. 10 is a configuration diagram illustrating a configuration of an indirect touch apparatus for belongings according to a fourth embodiment of the present invention.

FIG. 10 is a configuration diagram illustrating a configuration of an indirect touch apparatus for belongings according to a fourth embodiment of the present invention.

As illustrated in FIG. 10, the indirect touch apparatus 100 for belongings of the present invention may be configured in a fused or welded form with a case 110a so that the housing 110 may be coupled to the belongings.

For example, the indirect touch apparatus 100 may be mounted in a form fused or welded to one side of the rear surface of the case 110a for the portable terminal mounted outside the portable terminal 210. In this case, the case 110a for the portable terminal and the housing 110 may be formed as one body during molding.

On the other hand, all documents including publications, patent applications, patents, etc. cited in the disclosed embodiments are illustrated by combining each cited reference individually and specifically, or combined with embodiments disclosed in the same manner as those combined and indicated in the published embodiment as a whole.

In order to understand the disclosed embodiments, reference numerals are given in the preferred embodiments shown in the drawings, specific terms have been used to describe the disclosed embodiments, but the disclosed embodiments are not limited by the specific terms, and the disclosed embodiments may include all components commonly conceived by those skilled in the art.

The specific implementations described in the disclosed embodiments are examples, and do not limit the scope of the disclosed embodiments in any way. For brevity of the specification, descriptions of conventional electronic configurations, control systems, software, and other functional aspects of the systems may be omitted. In addition, the connection or connection members of the lines between the components illustrated in the drawings exemplarily represent functional connections and/or physical connections, and in an actual device, may be illustrated as various functional connections, physical connections, or circuit connections that can be replaced or added. In addition, unless there is a specific reference such as "essential", "important", etc., it may not be an essential component for application of the disclosed embodiment.

It will be understood by those skilled in the art that various embodiments may be made without departing from the technical spirit of the present invention. Therefore, the true scope of the present invention should be determined by the technical spirit of the appended claims.

[Explanation of Reference Numerals and Symbols]

| | | | |
|---|---|---|---|
| 20: | Draw-in/out guide path | 100: | Indirect touch apparatus |
| 110: | Housing | 111: | Protrusion part |
| 120: | Touch part | 130: | Pressing knob |
| 140: | Mounting part | 150: | Knob guide hole |
| 200: | belongings | 210: | Portable terminal |

-continued

[Explanation of Reference Numerals and Symbols]

| | | | |
|---|---|---|---|
| 310: | Torsion coil spring | 320: | Front-rear moving rail |
| 330: | Cover member | 340: | Roller |

The invention claimed is:

1. An indirect touch apparatus for belongings comprising:
   a housing (110) having a draw-in/out guide path (20) recessed in a longitudinal direction;
   a touch part (120) slidably provided in the draw-in/out guide path (20);
   a pressing knob (130) for drawing the touch part (120) into and out of the housing (110);
   a mounting part (140) provided on a rear surface of the housing (110); and
   a cover part that is rotatably provided on an inner surface of the housing (110) using a torsion coil spring to block a front end of the housing (110) when the draw-in of the touch part (120) is completed.

2. The indirect touch apparatus for belongings of claim 1, wherein the touch part (120) is provided to be flexible with a plate-like external shape.

3. The indirect touch apparatus for belongings of claim 1, wherein the mounting part (140) is bonded or fastened to the belongings (200), or fused or welded to the belongings so that the belongings (200) and the housing (110) are firmly fixed.

4. The indirect touch apparatus for belongings of claim 1, wherein the touch part (120) has a thickness of 0.5 mm to 1.5 mm.

\* \* \* \* \*